Feb. 12, 1929.　　　　　　　1,702,064
H. THOMAS
SLICING MACHINE
Filed Dec. 23, 1925　　　7 Sheets-Sheet 3

Feb. 12, 1929.

H. THOMAS

SLICING MACHINE

Filed Dec. 23, 1925 7 Sheets-Sheet 5

1,702,064

Feb. 12, 1929.　　　　　H. THOMAS　　　　　1,702,064
SLICING MACHINE
Filed Dec. 23, 1925　　　7 Sheets-Sheet 7

Patented Feb. 12, 1929.

1,702,064

UNITED STATES PATENT OFFICE.

HENRY THOMAS, OF LONDON, ENGLAND, ASSIGNOR TO U. S. SLICING MACHINE COMPANY, OF LA PORTE, INDIANA, A CORPORATION OF INDIANA.

SLICING MACHINE.

Application filed December 23, 1925, Serial No. 77,249, and in Great Britain January 1, 1925.

This invention relates to machines for slicing meat and other substances, and more particularly to so called "last slice holders" used on such machines for holding the end portion of the substance so that it can be cut down to the last slice.

In Henry Thomas's United States patent specification No. 1,026,721 there is described and claimed a form of last slice holder for a slicing machine which is pivoted to the substance clamp and can be turned about its pivot to an inoperative position when not in use.

My present invention is differentiated from this arrangement in that according to the invention a slicing machine has a member for supporting the substance to be sliced and means, normally lying concealed below said member, for holding the last portion of the substance to be sliced, said means, when required for use, being capable of an upward movement into the operative position. The said means may be capable of both a forward and upward movement. The member for holding the substance to be sliced (generally known as a "pin-plate" and hereinafter referred to as such) may have combined therewith or formed as part thereof, a last slice holder which normally lies down out of the way but is adapted, when desired, to be moved forwards and (or) turned upwards into the operative position.

The last slice holder may either be connected to or be carried by the pin-plate, said last slice-holder and pin-plate being permanently mounted on, or in, and substantially parallel to the substance table and arranged in such a manner that the last slice holder and the pin-plate can be moved forwards and (or) turned upwards so as to move said last slice holder into its operative position substantially parallel to the cutting edge of the knife. If the last slice holder is carried by the pin-plate, it may be mounted on and beneath an extension of said plate, the last slice holder normally occupying an inoperative position at the rear of the substance table, but the arrangement being such that said pin-plate is adapted to be turned upwards about one of its ends and thereafter slid relatively to said table into a position in which the last slice holder occupies an operative position at the front end of said table, means being provided for securing the pin-plate in its raised position.

The pin-plate, however, may be made in two parts hinged together at their inner edges, the last slice holder being carried on, and beneath, one of said parts, and the arrangement being such that said last mentioned part is adapted to be slid relatively to the substance table towards the first mentioned part, whereby the two parts are turned upwards and the last slice holder moved into an operative position at the front of the substance table, means being also provided for securing the two parts of the pin-plate in their raised positions. One of the two parts of the pin-plate may actually constitute the last slice holder, the other of said parts being adapted to be moved relatively to the substance table towards the last slice holder, whereby the two parts of the pin-plate are raised upwards and the last slice holder brought to its operative position, and means being also provided for securing the two parts of the pin-plate in their raised positions.

The last slice holder may comprise known devices for holding the meat or other substance, such as rotatable prong-bars operably connected together and each provided with a series of substance-holding prongs adapted to hold the substance; or immovably fixed prongs.

In order to secure the pin-plate or the two parts thereof in raised position, locking members may be provided, said members being adapted to be projected laterally from inoperative positions, which they occupy when the last slice holder is inoperative, into positions in which they co-act with fixed means on the substance table in order to secure the last slice holder in its operative position. The means for projecting the locking members laterally may also be adapted, simultaneously, to retract a member normally locking the prong bars referred to above against movement.

It will be understood that my invention is not restricted to the constructional examples referred to above and that the last slice holder may be widely varied without departing from the invention.

Several constructional embodiments of my invention applied to meat slicing machines are illustrated, by way of example, in the annexed drawings, whereon:—

Referring firstly to Figs. 1 to 4:—

Figure 1:
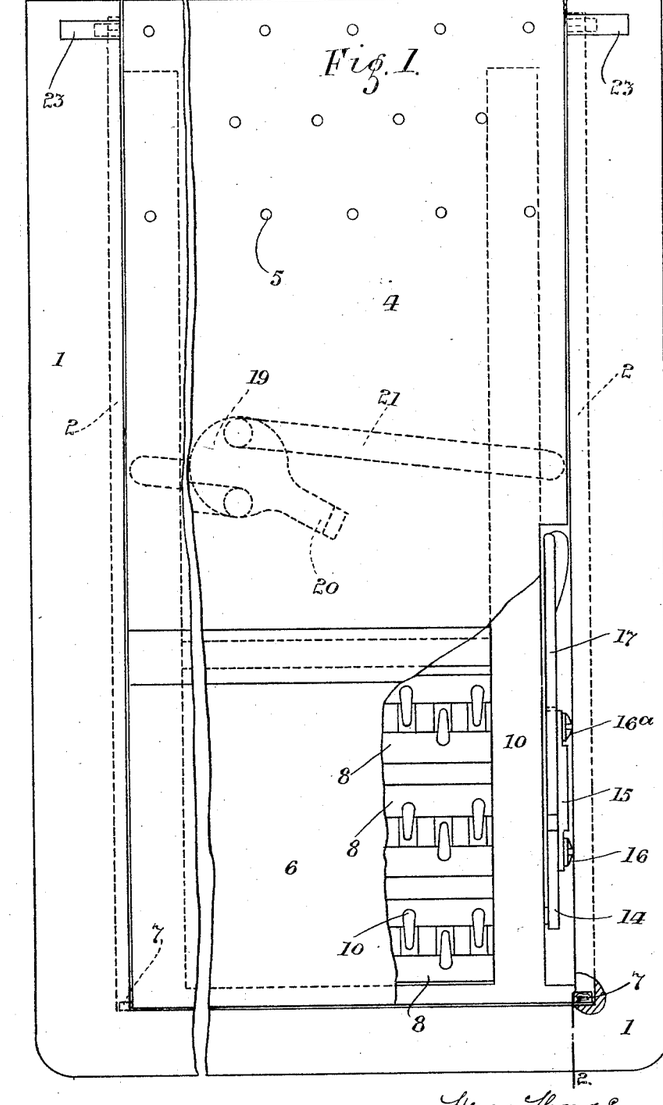
Fig. 1 is a plan view of one form of last slice holder which is carried by and beneath the pin-plate.
Figure 2:
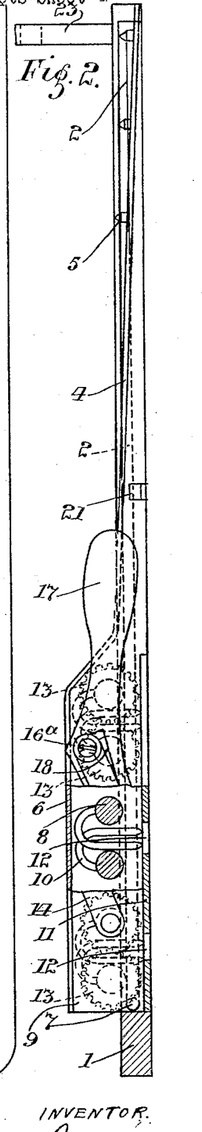
Fig. 2 is a sectional elevation on the line 2—2 in Fig. 1.

The meat table 1 is slidable as usual by means of nut and feed screw mechanism, transversely across the reciprocating under table or carriage of the machine (not shown) towards the knife (also not shown) but in the present case the meat table is formed as a three-sided frame. The two sides of the meat table which are disposed transversely of the under table or carriage are each formed with a longitudinal groove or guideway 2 provided at its forward end, or end nearest the knife, with a depressed portion 3. A pin-plate 4 is arranged between the longitudinal sides of the meat table 1 and is provided, at its front end, with a plurality of meat-holding pins 5 and extended at its rear end to form a raised part or housing 6 for a last slice holder described hereafter. The upper surface of the pin-plate slopes from front to rear as illustrated in Fig. 2. A pin 7 projects laterally from each side of the frame of the pin-plate and at the rear end thereof, said pins being slidably engaged in the guideways 2.

Figures 3, 4:
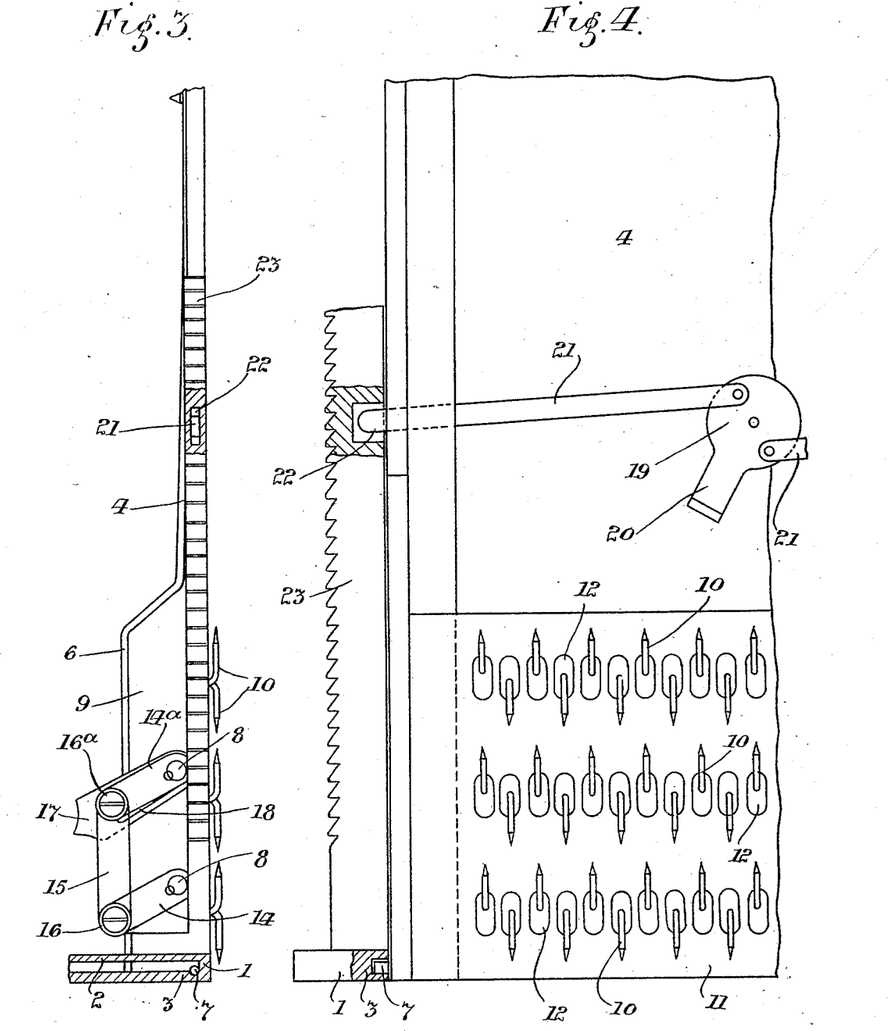
Fig. 3 is an end elevation partly in section showing the pin-plate and last slice holder thereon in their raised positions.
Fig. 4 is a fragmentary view, corresponding to Fig. 3, of the back of the pin-plate and illustrates the method of connecting the pin-plate to one of the existing uprights for the meat clamp.

A plurality of prong-bars 8, arranged transversely of the pin-plate, are rotatably mounted in the side members 9 of the housing 6, and a series of spaced meat prongs 10 are provided on each bar with the prongs on one bar projecting therefrom in opposite directions to the prongs on the next adjacent bar. The housing 6 is closed by a plate 11 formed with rows of apertures 12 through which the prongs on the pairs of adjacent bars are arranged to be projected into operative position as shown in Figs. 3 and 4. The prong bars 8 are operably connected to each other by means of toothed pinions 13, whereby when one of said prong bars is rotated all the prong bars are rotated in unison and the arrangement being such that the prong bars of each adjacent pair of prong bars, having the prongs 10 projecting in opposite directions, are rotated in opposite directions. The prong bars 8 are operably connected to each other, so as to operate in unison, by means of links 14 and 14ª, see Fig. 3, secured to two of the prong bars and interconnected by means of a third link 15 which is secured to the links 14 and 14ª by means of pins 16 and 16ª. An operating lever 17 is formed with an elongated slot 18 adapted to embrace the link 14ª, said slot being sufficiently wide to permit of a certain amount of lost motion whereby said lever can, in the inoperative position of the last slice holder, be turned down to a position in which it cannot impede access to the pin plate, see Fig. 2.

In order to move the last slice holder into the operative position, the front end of the pin plate 1 is raised and simultaneously the rear end thereof is moved forward, the pins 7 sliding freely in the guideways 2 and eventually engaging in the depressed portions 3 of the guideways. The pin plate is then moved to the vertical position and is locked in that position by means comprising a wrist-plate 19 pivoted at the back of the pin plate and provided with an extension or handle 20. Locking bolts 21 are secured to the wrist plate 19 and are adapted to be engaged in apertures 22 formed in the two existing uprights 23 for the usual meat clamp (not shown) when the wrist plate is turned to the position indicated in Fig. 4. The last slice holder is then ready for operation and it is only necessary to pull the lever 17 forward into the position shown in Fig. 3 in order to rotate the prong-bars 8 and project the prongs 10 forwards through the apertures 12 in the plate 11, the rotation of the prong-bars being caused by the engagement of the link 14ª in the slot 18 of the lever 17 and the intermeshing of the pinions 13. In order to lower the pin plate 4 into the meat table the locking bolts 21 are disengaged from the apertures 22 in the uprights 23 by turning the wrist plate 19 in the opposite direction, the pins 7 are raised out of engagement with the depressed portions 3 of the guideways 2 and the pin-plate then slid rearwards while its front end is simultaneously lowered.

Figure 5:
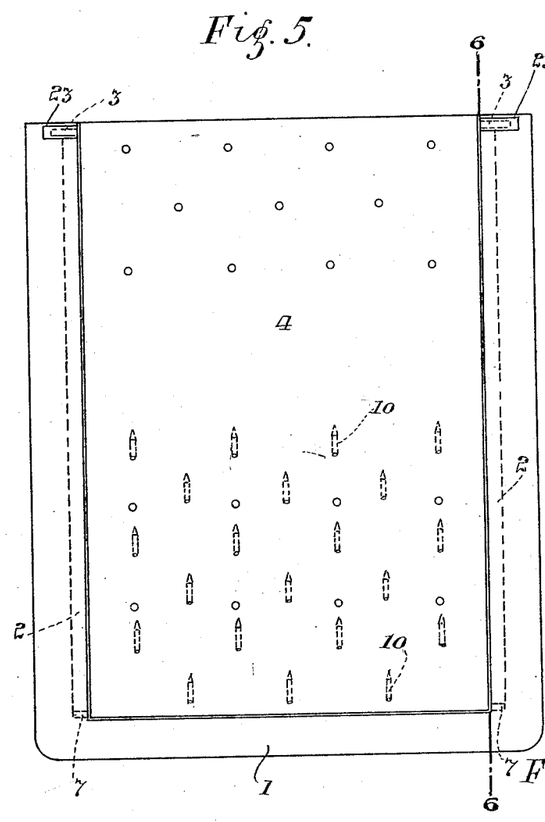
Fig. 5 is a plan view to a reduced scale of a modified form of combined pin-plate and last slice holder in which the prongs of the last slice holder are immovably fixed.
Figures 6, 7:
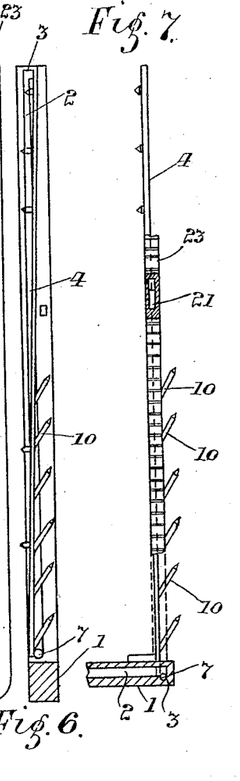
Fig. 6 is a section on the line 6—6 in Fig. 5.
Fig. 7 is a fragmentary view, partly in section, showing the pin-plate and last slice holder in their raised positions.

The modification illustrated in Figs. 5, 6 and 7 differs from the construction first described in that the prongs 10 of the last slice holder are permanently fixed to the underside of the pin plate 4. Otherwise, the two constructions correspond, being moved longitudinally of the meat table in like manner and the modification needs no further description. It will, of course, be understood that the construction in Figs. 5 and 6 is provided with locking bolts 21 although these are not illustrated in Figs. 5 and 6.

Figure 8:
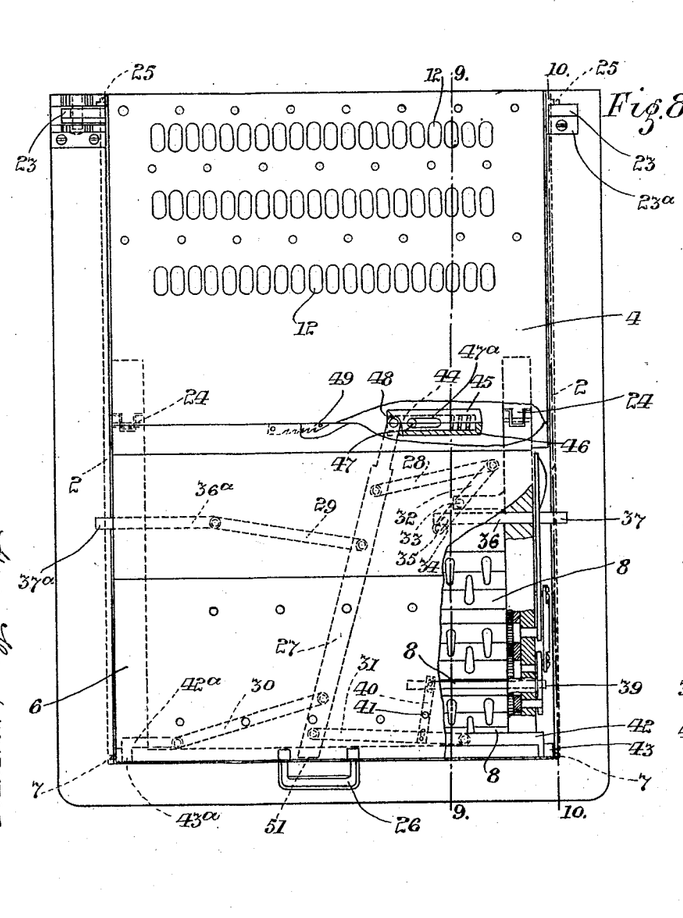
Fig. 8 is a plan view, partly in section, of a modification, in which the pin-plate is made in two parts hinged together at their inner edges, one of said parts carrying the last slice holder.
Figure 9:
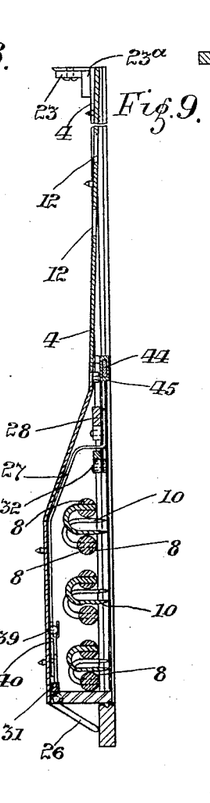
Fig. 9 is a section on the line 9—9 in Fig. 8.
Figure 10:
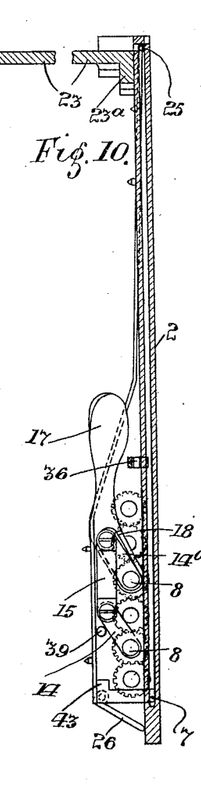
Fig. 10 is a section on the line 10—10 in Fig. 8.
Figure 11:
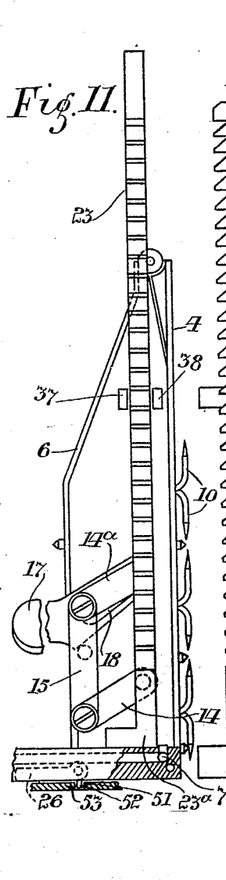
Fig. 11 is an end view, partly in section, showing the last slice holder raised and secured in its operative position.
Figure 12:
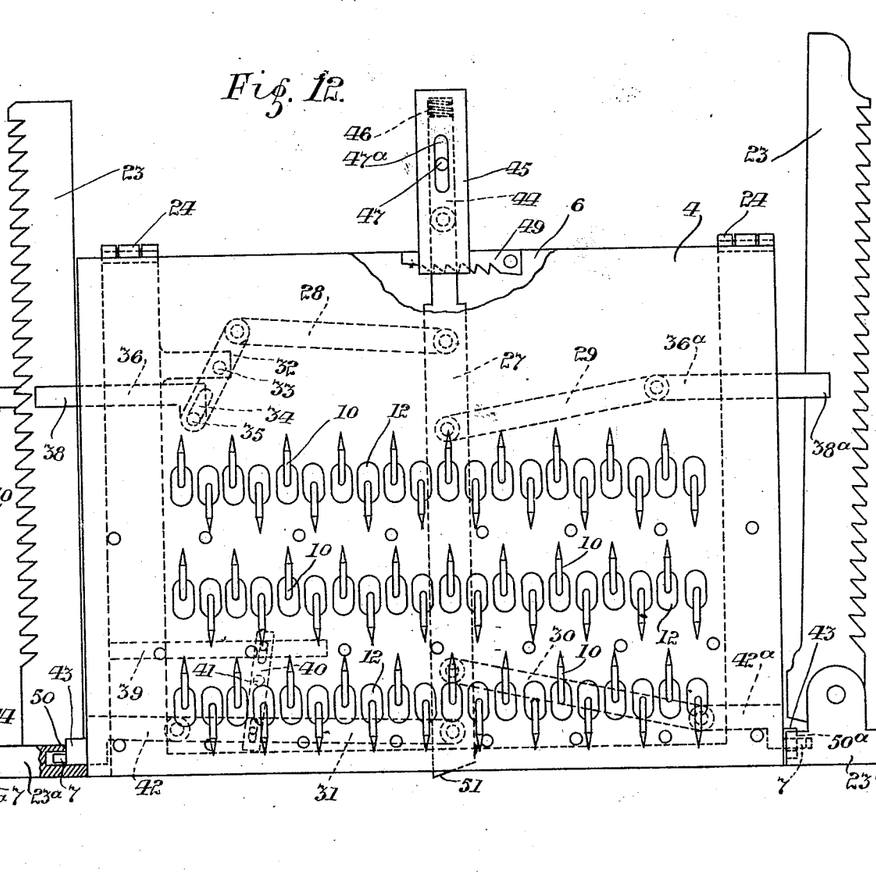
Fig. 12 is a front view corresponding to Fig. 11 and shows the prongs of the last slice holder fully projected.

The modified construction illustrated in Figs. 8, 9 and 10, however, differs essentially from either of the two previously described constructions in that the pin-plate 4 is connected by hinges 24 to the housing 6 of the last slice holder, and is itself hinged at 25 at its front end. The prong-bars 8, prongs 10, and operating mechanism therefor are the same as described in connection with Figs. 1 to 4 but it should be noted that the apertures 12 through which the prongs are projected into their operative positions are, in this case, formed in the part 4 of the pin-plate and not in the housing 6. A handle 26 is provided at the rear end of the housing 6 for use when moving the last slice holder into operative position as described hereafter. When the last slice holder is to be brought into its operative position, indicated in Figs. 11 and 12, the rear end of the housing 6 is advanced towards the front end of the pin-plate 4, the pins 7 sliding in the grooves 2, whereupon the hinge-connected ends of the pin-plate and housing are raised until the two plates are vertical, as shown in Fig. 11. In order to lock the pin-plate and housing in this position, a lever 27 is provided at the inside of the housing, said lever being bent, as shown in Fig. 9, to conform to the contour of the housing. Links 28, 29, 30 and 31 are pivotally secured to the lever 27, the first mentioned link being pivotally connected, at its other end, to a lever 32 pivoted, at 33, to the frame of the pin-plate and provided with an elongated slot 34 in which engages a pin 35 fixed to a slidable bolt 36 formed at its outer end with two arms 37 and 38, see particularly Figs. 8, 11 and 12. The link 29 is also pivotally connected to a locking bolt 36ª formed with two arms 37ª and 38ª. The bolts 36 and 36ª project through apertures in the side members of the housing 6. A pin 39, slidable through an aperture in one of the side members of the housing 6, is adapted, in its operative or normal position, to engage with the link 14 connected to one of the prong-bars 8, as shown in Fig. 10, thus preventing the lever and link mechanism for rotating said prong-bars being operated until such times as the pin 39 is withdrawn. This operation is carried out by connecting the said pin to a lever 40 pivoted to the housing 6 at 41 and pivotally connected, at its other end, to the link 31 which is, in turn, pivotally connected to a locking bar 42. The latter is slidable through an aperture in the side member of the housing 6 and is formed at its extremity with a projection 43 whose purpose is referred to hereafter. The link 30 is connected to a similar locking bar 42ª also provided with a projection 43ª at its extremity. A collapsible handle is provided at one end of the lever 27 and comprises a guide member 44 pivoted to the end of said lever and a handle proper 45 slidable on said guide member and spring-pressed away from the end of the lever 27 by means of a spring 46 arranged between the member 44 and the inner wall of the handle. A pin 47 extends laterally from both sides of the guide member 44 and engages in elongated slots 47ª in the handle 45. A tooth or projection 48 is provided on one side of the handle 45 and is adapted, in the position of the handle shown in Fig. 12, to engage with one or other of the recesses formed in a toothed plate 49 secured in the inside of the housing 6.

The pin-plate 4 and last slice holder housing 6 are raised into their vertical positions by means of the handle 26 and the lever 17, which latter cannot operate the last slice holder on account of the locking pin 39 being against the link 14. If, however, the handle 45 is raised through the gap left between the top edges of the pin-plate 4 and housing 6, see Fig. 11, and the lever 27 is moved to the left, as viewed in Fig. 8, by said handle, the locking pin 39 is withdrawn into said housing and, simultaneously, the locking bolts 36, 36ª, 42 and 42ª are moved outwards. The arms 37 and 38 and 37ª and 38ª, respectively, of the locking bolts 36 and 36ª then engage on opposite sides of the existing uprights 23 of the meat plate 1 and, further, the projections 43 and 43ª on the bolts 42 and 42ª are also moved into engagement with slots 50 and 50ª, Fig. 12, formed in the bases 23ª of said uprights. The continued movement of the lever 27 and handle 45 to the left causes a cam 51 on the bottom of said lever to engage in a slot 52 provided in a member 53 on the frame of the meat table 1, see Figs. 11 and 12, thereby providing additional security and rigidity for the raised pin-plate and last slice holder. As soon as pressure is released from the handle 45, the latter moves upwards and the tooth 48 thereon engages one or other of the recesses in the rack 49 thus locking the lever 27.

When returning the pin-plate and last slice holder to the position indicated in Figs.

8, 9, and 10, the tooth 48 is first disengaged from the rack 49, and the lever 27 turned to the right as viewed in Fig. 8, whereupon the bolts 36, 36ᵃ, 42 and 42ᵃ are retracted and the locking pin 39 advanced to engage with the link 14.

Figure 13:
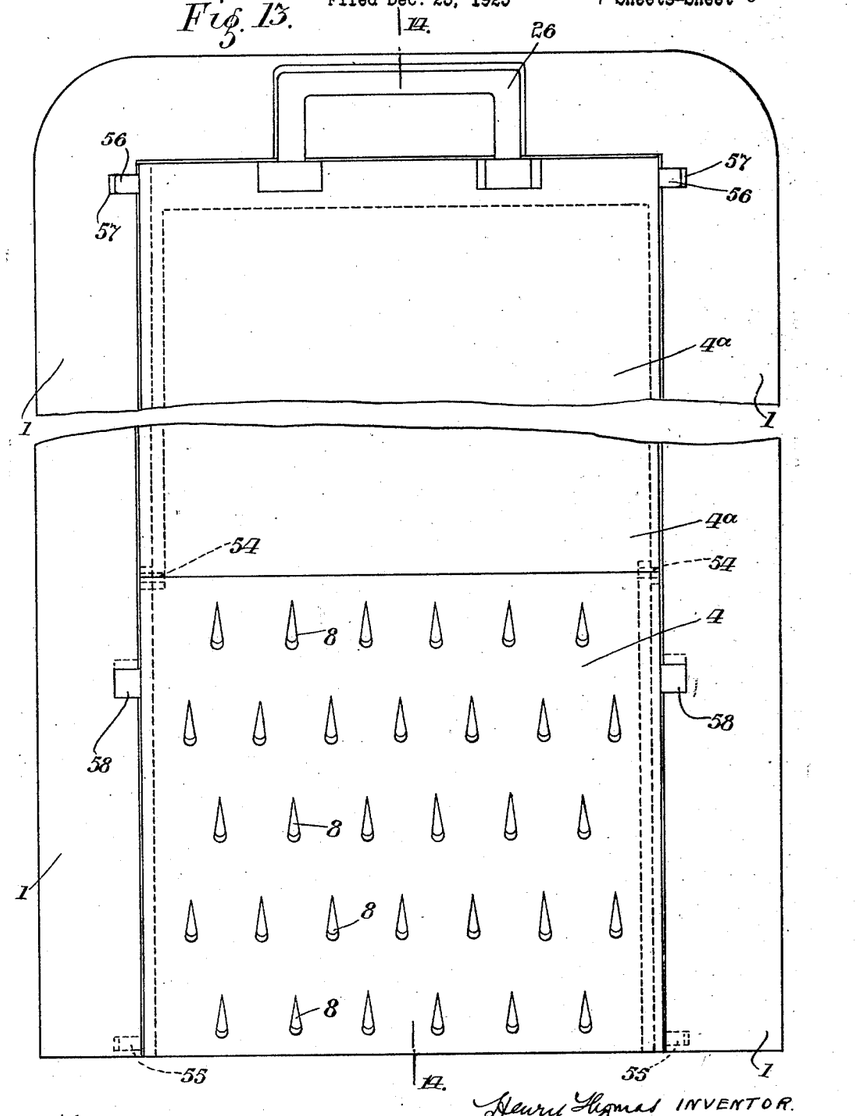
Fig. 13 is a plan view of a further modification in which the pin-plate is also made in two parts hinged together but wherein the prongs of the last slice holder are fixed in the top side of one part of the pin-plate.
Figures 14, 15:
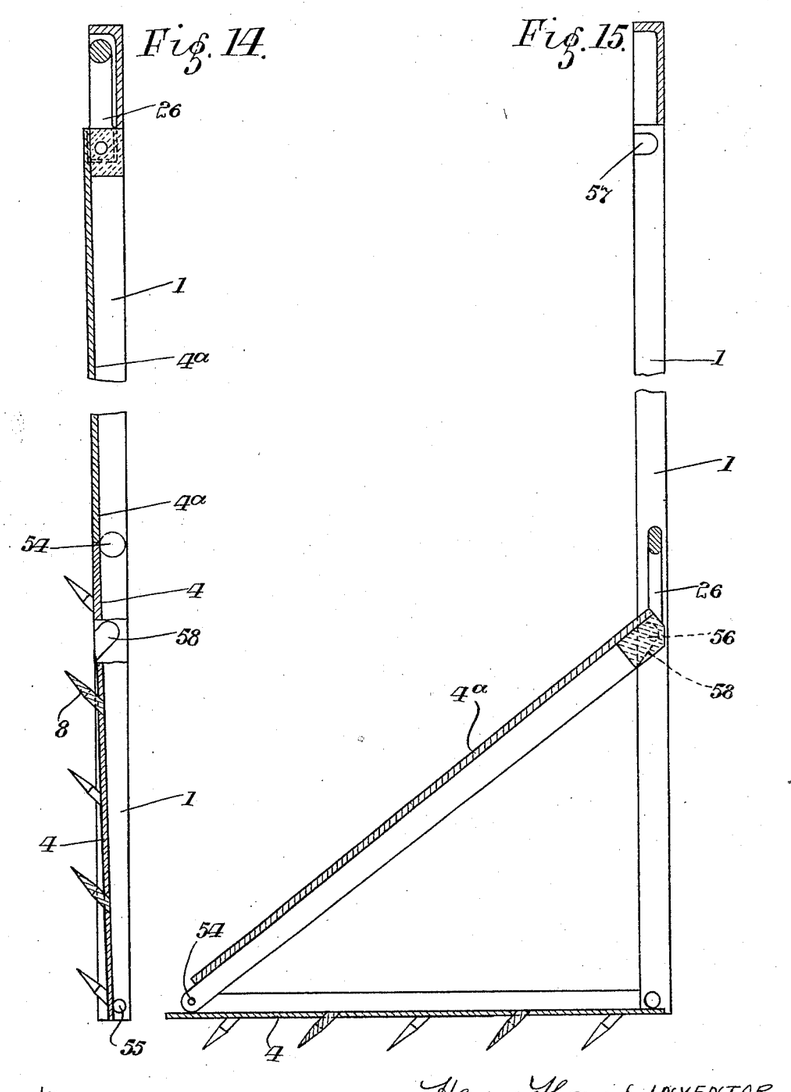
Fig. 14 is a section on the line 14—14 in Fig. 13.
Fig. 15 is a similar view but showing the hinged pin plate in a different position.

In the modified construction illustrated in Figs. 13 to 15, the pin-plate comprises two parts 4 and 4ᵃ, the former being provided with fixed meat prongs 8 so as to form a last slice holder and the two parts being hinged together at 54. The front edge of the part 4 is pin-jointed at 55 to the meat table 1 and laterally extending pins 56 are also provided on the part 4ᵃ and normally engaged in recesses 57 formed in the sides of the meat table. A handle 26 is provided on the part 4ᵃ.

In order to move the last slice holder into its operative position, shown in Fig. 15, the pins 56 are first disengaged from the recesses 57 by raising the corresponding edge of the plate 4ᵃ. The two plates 4ᵃ and 4 are then raised until the pins 56 are in a position to engage in two recesses 58 formed in the side members of the meat table 1, in which position the plate 4, or last slice holder, will be vertical as shown in Fig. 15.

Instead of combining the pin-plate with the last slice holder device as already described, said device might be normally disposed at the rear of, and beneath, the pin-plate and separate therefrom. In order then to bring the last slice holder into its operative position the pin-plate would be removed and the holder slid forward until pins thereon, engaging in recesses in the meat table, dropped into recesses at the front end of said table whereupon the last slice holder would be turned upwards into a vertical position and held in that position by locking means engaging with the existing uprights for the meat clamp.

The invention is not limited to the constructions described and illustrated and it will be obvious that various modifications can be made within the invention.

Having now fully described my invention, what I claim and desire to secure by Letters Patent is:—

1. In a slicing machine, a member for supporting the substance to be sliced, and means, combined with said member, for holding the last portion of the substance to be sliced, said means normally reclining out of the way so as to give free access to the top of said member and means for moving said first-mentioned means forwardly into operative position.

2. In a slicing machine, a member for supporting the substance to be sliced, and means, combined with said member, for holding the last portion of the substance to be sliced, said means normally reclining out of the way so as to give free access to the top of said member and means for turning said first-mentioned means upwardly and moving it forwardly into operative position.

3. In a slicing machine, a member for supporting the substance to be sliced, and means carried by said member for holding the last portion of the substance to be sliced, said means normally reclining out of the way so as to give free access to the top of said member and means for moving said member forwardly to position said first-mentioned means in operative position.

4. In a slicing machine, a member for supporting the substance to be sliced, and means carried by said member for holding the last portion of the substance to be sliced, said means normally reclining out of the way so as to give free access to the top of said member and means for erecting said member and moving it forwardly to position said first-mentioned means in operative position.

5. In a slicing machine, a supporting member for the substance to be sliced, a table member on which said supporting member is mounted, means combined with the substance supporting member for holding the last portion of the substance to be sliced, said means normally reclining so as to give free access to the top of said substance supporting member, and means for moving said first-mentioned means forwardly, relatively to the table member into operative position.

6. In a slicing machine, a supporting member for the substance to be sliced, a table member on which said supporting member is mounted, means combined with the substance-supporting member for holding the last portion of the substance to be sliced, said means normally reclining so as to give free access to the top of said substance supporting member, and means for turning said first-mentioned means upwardly and moving it forwardly into operative position.

7. In a slicing machine, a supporting member for the substance to be sliced, a table member on which said supporting member is mounted, means carried by the substance-supporting member for holding the last portion of the substance to be sliced, said means normally reclining so as to give free access to the top of said substance supporting member, and means for moving said first-mentioned means forwardly relatively to the table member into operative position.

8. In a slicing machine, a supporting member for the substance to be sliced, a table member on which said supporting member is mounted, means carried by the substance-supporting member for holding the last portion of the substance to be sliced, said means normally reclining so as to give free access to the top of said substance supporting member, and means for turning said first-mentioned means upwardly and moving it forwardly relatively to the table member into operative position.

9. In a slicing machine, a plate member for supporting the substance to be sliced, a table member on which the plate member is mounted, means combined with said plate member for holding the last portion of the substance to be sliced, said means normally reclining so as to give free access to the top of said plate member, and co-acting means on the plate member and table member for moving said first mentioned means forwardly into operative position.

10. In a slicing machine, a plate member for supporting the substance to be sliced, a table member on which the plate member is mounted, means carried by said plate member for holding the last portion of the substance to be sliced, said means normally reclining so as to give access to the top of said plate member, and co-acting means on the plate member and table member for moving first mentioned means forwardly into operative position.

11. In a slicing machine, a plate member for supporting the substance to be sliced, a table member on which the plate member is mounted, means combined with said plate member for holding the last portion of the substance to be sliced, said means normally reclining so as to give access to the top of said plate member, and co-acting means on the plate member and table member for turning said first mentioned means upwardly and moving it forwardly into operative position.

12. In a slicing machine, a plate member for supporting the substance to be sliced, a table member on which the plate member is mounted, means carried by said plate member for holding the last portion of the substance to be sliced, and co-acting means on the plate member and table member whereby said first mentioned means, which normally reclines out of the way so as to give free access to the top of said plate member, can be moved forwards and turned upwards into the operative position.

13. In a slicing machine, a plate member for supporting the substance to be sliced, a table member on which the plate member is mounted, means carried by said plate member for holding the last portion of said substance to be sliced, means whereby said plate member can be moved forwards and turned upwards from a reclining position relatively to said table member so as to bring said first mentioned means into the operative position, and means for locking the plate member in its raised position.

14. In a slicing machine, a plate member for supporting the substance to be sliced, a table member on which the plate member is mounted, means carried by and beneath said plate member for holding the last portion of said substance to be sliced, means whereby said plate member can be moved forwards and turned upwards from a reclining position relatively to said table member so as to bring said first mentioned means into the operative position, and means for locking the plate member in its raised position.

15. In a slicing machine, a plate member for supporting the substance to be sliced, a table member on which the plate member is mounted, turnable means carried by and beneath said plate member for holding the last portion of the substance to be sliced, co-acting means on said plate member and table member whereby the plate member can be moved forwards and turned upwards from a reclining position so as to bring said turnable means into the operative position, and movable means on the plate member adapted to co-act with means on the table member to lock the plate member in its raised position.

16. In a slicing machine, a plate member for supporting the substance to be sliced, upstanding means thereon for engaging with said substance, a table member on which the plate member is mounted, a last slice holder carried by and beneath said plate member and comprising turnable members, and means on said turnable members for engaging with the substance to hold the latter so that the last portion thereof can be sliced, guide members on said plate member slidable in guideways on said table member so that the plate member can be moved forwards and turned upwards relatively to the table member and the last slice holder moved into the operative position, and movable means on the plate member adapted to co-act with means on the table member to lock the plate member in its raised position.

17. In a slicing machine, a plate member for supporting the substance to be sliced, upwardly projecting pins thereon for engaging with said substance, a table member on which the plate member is mounted, a last slice holder carried by and beneath said plate member and comprising turnable members, an apertured plate, and means on said turnable members adapted to be projected through the apertured plate to engage with the substance and hold it firmly against said plate, guide members on said plate member, guideways on said table member so that the plate member can be moved forwards and turned upwards relatively to the table member and the last slice holder moved into the operative position, and movable means on the plate member adapted to co-act with means on the table member to lock the plate member in its raised position.

18. In a slicing machine, a plate member for supporting the substance to be sliced, a table member on which the plate member is mounted, a last slice holder mounted on and beneath said plate, co-acting means on the plate member and table member whereby the former can be moved forwards and turned upwards relatively to the latter so as to bring the last slice holder into the operative position, means for limiting the forward movement of the plate member, and means for locking the latter in its raised position.

19. In a slicing machine, a plate for supporting the substance to be sliced, a table member whereon said plate is mounted, a last slice holder carried by and beneath said plate and comprising turnable bars, an apertured plate, prongs on said bars adapted to be projected through said plate to engage with the substance and hold it firmly against said plate, a pin on each side of the plate slidable in grooves in said table so that the plate can be moved forwards and turned upwards relatively to the table, whereby the last slice holder is moved into the operative position, said grooves having recessed portions for limiting the forward movement of said plate, fixed abutments on said table having apertures for the reception of movable members on said plate to fix the last slice holder in the operative position.

20. A slicing machine having a member for supporting the substance to be sliced and means, normally lying concealed below said member, for holding the last portion of the substance to be sliced, said means, when required for use, being capable of an upward movement into the operative position.

21. A slicing machine having a member for supporting the substance to be sliced and means, normally lying concealed below said member, for holding the last portion of the substance to be sliced, said means, when required for use, being capable of a forward and upward movement.

22. A slicing machine having a member for supporting the substance to be sliced and means, normally lying concealed below said member, for holding the last portion of the substance to be sliced, said means, when required for use, being capable of a forward and also of a turning movement.

23. A slicing machine having a member for supporting the substance to be sliced and means, normally lying concealed below said member, for holding the last portion of the substance to be sliced, said means, when required for use, being capable of a sliding and turning movement.

24. In a slicing machine, a plurality of supports adapted to be selectively used for supporting the substance to be sliced, one of said supports having its substance engaging face movable into an operative position parallel with the cutting plane of the slicing machine and into an inactive position to a plane transversely of said cutting plane.

In testimony whereof I affix my signature.

HENRY THOMAS.